United States Patent Office 3,355,023
Patented Nov. 28, 1967

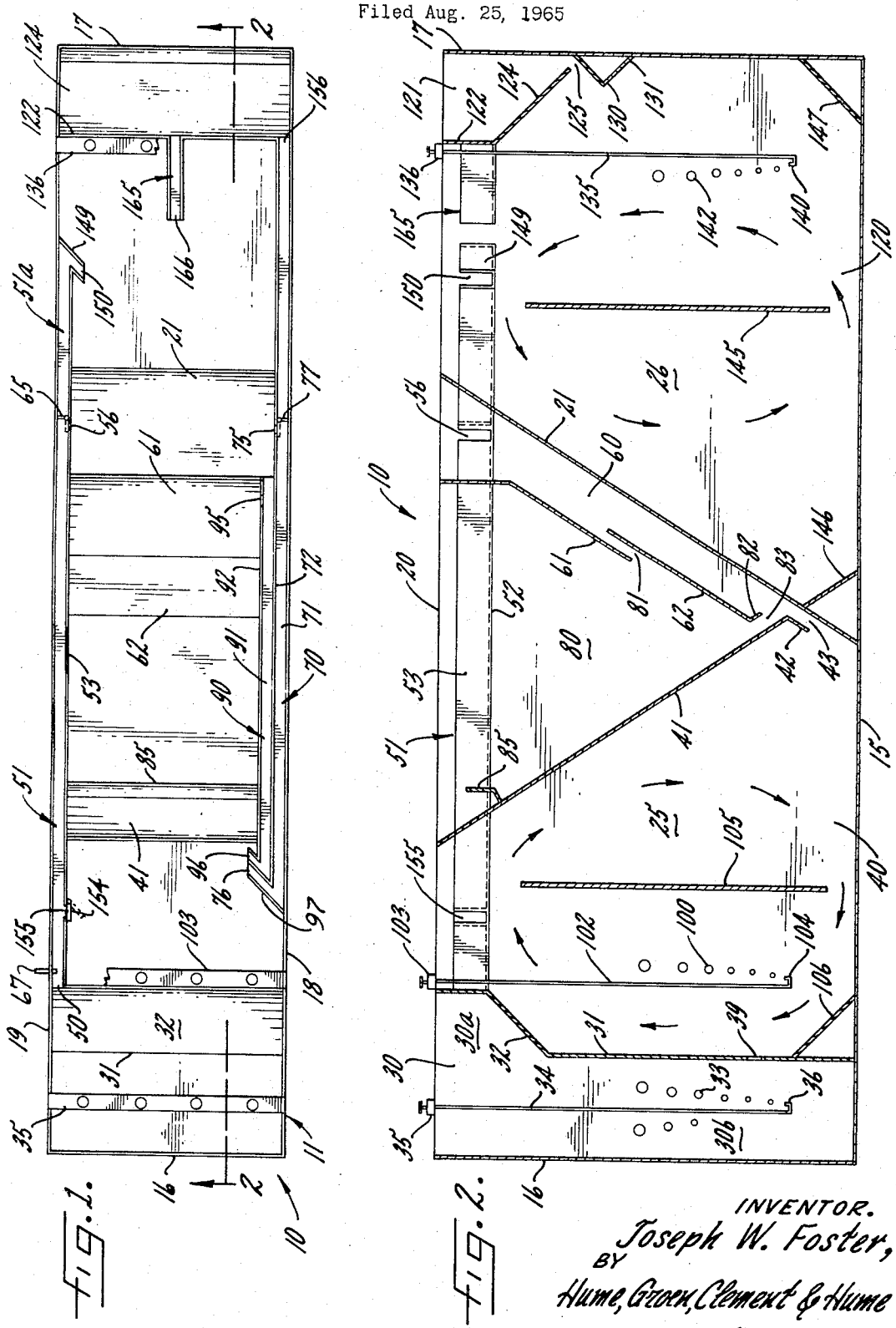

3,355,023
SEWAGE TREATMENT SYSTEM
Joseph W. Foster, Kansas City, Mo., assignor to Union Tank Car Company, Chicago, Ill., a corporation of New Jersey
Filed Aug. 25, 1965, Ser. No. 482,523
4 Claims. (Cl. 210—195)

ABSTRACT OF THE DISCLOSURE

A sewage treatment system comprising a unitary tank partitioned into a raw sewage treatment section and a waste sludge treatment section. Sewage treatment is effected in a two-stage aeration process. Excess activated sludge is then directed to the sludge treatment section where it is endogenously respirated to sludge ash.

This invention relates in general to the treatment of sewage and more particularly to a system which employs "activated sludge" in sewage treatment.

The activated sludge process of treating sewage is widely known and practiced as are modification of it such as the "contact stabilization" process. These processes employ aerobic biological stabilization of sewage pollutants in a well-known manner.

The activated sludge of these processes is a flocculent, heterogenous mixture of inert materials and micro-organisms. The micro-organisms of primary significance are bacteria and protozoa. When untreated sewage is mixed with activated sludge, the micro-organisms in the sludge stabilize the biodegradable organic materials of the sewage by metabolism, producing carbon dioxide, water, and newly synthesized microbial cells or activated sludge. Separation of the activated sludge from the water by sedimentation produces a clear, supernatant liquid that can be safely discharged to a receiving stream or river or the like.

The activated sludge which settles out by sedimentation is normally retained in the system for mixing with additional untreated sewage. After the plant or system has been in operation for a period of time, however, it becomes necessary to dispose of some of the accumulated sludge. The sludge mass can be significantly reduced by aerating it for an extended period of time in the absence of organic food or sewage by a process known as endogenous respiration or aerobic digestation. It is similar to basal metabolism in animals; that is, the microbes literally eat or burn themselves up. Ultimate disposal of the digested sludge ash can be safely carried out by spreading it on agricultural land, for example.

There are sewage treatment systems in use today which provide both activated sludge treatment of the raw sewage and endogenous respiration of excess sludge. They are, however, ordinarily composed of individual treatment units arranged and interconnected in a relatively complicated and expensive manner. An example of this type of system is found in the Gambrel Patent No. 3,047,492, entitled "Sewage Digesting Process."

It is an object of the present invention to provide an improved sewage treatment system.

It is another object to provide a sewage treatment system which incorporates an activataed sludge raw sewage treatment stage and an endogenous respiration stage in a single unit.

It is still another object to provide a simple and inexpensive sewage treatment system incorporating a raw sewage treatment unit and a waste sludge treatment unit.

The foregoing and other objects are realized in accordance with the present invention by producing a sewage treatment system comprising a single treatment tank partitioned into a raw sewage treatment section and a waste sludge treatment section. Highly effective treatment of the raw sewage with activated sludge and the assistance of "two stage" aeration is carried out in the raw sewage treatment section until a predetermined excess amount of activated sludge accumulates therein. By a simple diversion operation, the system is then adapted to direct this excess activated sludge to the sludge treatment section for aeration of raw sewage. Endogenous respiration of this activated sludge takes place and the resulting sludge ash is removed for use as a fertilizer or the like.

The invention, together with its organization and method of operation, taken with other objects and advantages thereof, is illustrated more or less diagrammatically in the drawings, in which:

FIGURE 1 is a plan view of a sewage treatment system embodying features of the present invention; and FIGURE 2 is a sectional view taken along line 2—2 of FIGURE 1.

Referring now to the drawings, a sewage treatment system embodying features of the present invention is illustrated generally at 10. The system 10 employs a form of the conventional activated sludge process in a sewage treatment tank 11. The tank 11 supports both activated sludge treatment of raw sewage and endogenous respiration of waste sludge in a single unit according to the present invention. The tank 11 is controlled to selectively operate in its raw sewage treatment capacity or in its sludge digestion capacity.

The tank 11 takes the form of an elongated rectangular box-like structure fabricated primarily of steel plate and having a floor 15, end walls 16 and 17, and side walls 18 and 19. The tank 11 is open at its top 20. An inclined partition wall 21 in the tank 11 extending between the side walls 18 and 19 separates the tank into a raw sewage treatment section 25 and a waste sludge endogenous respiration section 26.

The raw sewage treatment section 25 includes a first stage aeration chamber 30 defined by the end wall 16 and a partition wall 31 extending between the side walls 18 and 19 and the floor 15 of tank 11, up to open top 20 thereof. The partition wall is offset at 32 adjacent its top to provide a relatively wide chamber portion 30a at the top of the chamber 30 over a lower relatively narrow portion 30b. Untreated sewage is introduced to the first stage aeration chamber 30 in a suitable manner, through an inlet pipe, for example, for treatment in the tank 11 according to the present invention.

In the first stage aeration chamber 30 the raw sewage comprising solid bearing liquid is violently agitated and aerated by rising columns of air bubbles 33 emitted by a spaced series of air diffuser pipes 34 depending from an air diffuser manifold 35 extending across the open top of the tank 20 between the side walls 18 and 19. High pressure air delivered to the manifold 35 from any suitable source (not shown) passes down through the diffuser pipes 34 and is emitted from their open lower ends 36 in the lower regions of the accumulated raw sewage and activated sludge in the first stage aeration chamber 30.

Aeration in the first stage aeration chamber 30 is extremely violent; so violent in fact that the rising air bubbles act as a lift pump and draw activated sludge into the chamber 30 through a horizontally elongated opening 39 in the partition wall 31 from the second stage aeration chamber 40. The chamber 40 is defined between the wall 31 and an inclined partition wall 41 extending between the side walls 18 and 19 of the tank 11 adjacent and roughly perpendicular to the partition wall 21 separating the tank sections 25 and 26. The wall 41 extends from the open top 20 of the tank 11 downwardly to a point immediately adjacent the wall 21 and above the floor 15 of the tank where a lower flange 42 is formed on the wall 41 leaving an opening 43 into the second stage aeration chamber 40.

During aeration treatment of the raw sewage in the first stage aeration chamber 30, in the presence of activated sludge, the sludge organisms begin to stabilize biologically degradable organics in the sewage by metabolism. All during this time a continuous flow of sewage and sludge departs the aeration chamber 30 through a port 50 in the partition wall 31 above its offset 32 along one side wall 19 of the tank 11. The port 50 opens into a trough 51 extending along the wall 19 adjacent the tank top 20. The trough is defined by a bottom wall 52, an inner wall 53, and the upper portion of the side wall 19.

The sewage and sludge departing the first aeration chamber 30 through the trough 51, during the activated sludge treatment of raw sewage in the tank section 25, enters an energy absorption chamber 60 through a port 56 in the inner wall 53 of the trough. The energy absorption chamber 60 is defined by partition wall sections 61 and 62 on one side and the partition wall 21 on the other side.

The trough 51 actually extends further along the wall 19 of the tank 11 into the digester section 26 of the tank, but the construction and operation of this portion of the trough 51 is significant to the aerobic digestion of waste sludge and not to the activated sludge treatment of raw sewage. Accordingly, it will not be discussed at this point. Suffice it to say for the moment that communication with the section 26 of the tank 11 through the trough 51 is shut off during activated sludge treatment in the section 25 by maintaining a pivotally mounted gate 65 in the trough adjacent the port 56 in its solid line position. For reasons which will also be hereinafter discussed, the gate 65 alternatively pivots 90° to its dotted line position to close the port 56 and open the trough 51 to the digestor section 26.

As has been pointed out, however, during activated sludge treatment of raw sewage in the section 25 of the tank 11, the flow of sewage and sludge passes continuously from the chamber 30 through the trough 51 into the energy absorption chamber 60. A continuous flow through the trough 51 occurs because of a considerable hydraulic head differential between the aeration chamber 30 and the energy absorption chamber 60. The head differential is established because of the large quantity of air diffused upwardly through the sewage and sludge in the chamber 30. The trough 51 is fitted with an adjustable flow throttling gate 67 which controls the rate that sludge is drawn from the chamber 40 into the chamber 30 by controlling flow from the chamber 30, thus determining sludge cycle time between aeration chamber 30 and aeration chamber 40 for the sewage treatment in the system 10.

A portion of the flow of sewage and activated sludge entering the energy absorption chamber 60 is diverted directly to the second stage aeration chamber 40 through a surface skimming trough 70 adjacent the opposite side 18 of the tank 11. The skimming trough 70 is defined by a bottom wall 71 and an inner wall 72 suitably secured to the side wall 18 of the tank 11. For reasons hereinafter discussed, it extends into the sludge treatment section 26. With regard to sewage treatment, however, a port 75 in the inner wall 72 of the trough 70 provides access to the trough 70 from the energy absorption chamber 60, and a pivotally mounted gate 77 in the trough 70, alternatively swingable to close the port 75, seals off the section 26 of the tank 11 in its solid line position.

The portion of sewage and sludge which enters the trough 70 through the port 75 flows into the chamber 40 through the open mouth 76 of the trough. A baffle 97 on one side of the mouth 76 is inclined horizontally away from the direction of flow of sewage in the second stage aeration chamber 40 (hereinafter discussed in detail) whereby fluid flow past the mouth 76 develops suction in the trough 70 necessary to effect skimming in the energy absorption chamber 60. The aforementioned portion of the sewage and activated sludge is thus drawn from the chamber 60 into the trough 70 and, subsequently, into the aeration chamber 40.

The remaining major portion of the sewage and sludge flow entering the energy absorption chamber 60 from the trough 51 passes into the settling chamber 80 defined between the partition wall 41 and the partition wall sections 61 and 62. The partition wall sections 61 and 62 are horizontally spaced to provide an entrance mouth 81 into the settling chamber 80 from the energy absorption chamber 60. A flange 82 on the lower end of the partition wall section 62 terminates short of the partition wall 41 to provide an exit mouth 83 from the settling chamber 80.

In the settling chamber 80 there is no agitation and the sludge settles and passes through the exit mouth 83 in the lower end of the chamber 80 to the exit mouth 43 from the energy absorption chamber 60. The sludge is drawn into the second stage aeration chamber 40 through the mouth 43 by the suction action of the sewage and sludge in the chamber 40 flowing downwardly over the flange 42 past the mouth 43 in a manner hereinafter discussed. At the same time, supernatant liquid suitable for disposal passes over a weir 85 mounted against the partition wall 41 in the upper reaches of the settling chamber 80 and is drawn out of the tank 11 in a well known manner.

While sludge is settling in the chamber 80, light solids which collect in the form of scum on the surface of the liquid in the chamber are continuously skimmed and returned to the second stage aeration chamber 40 through a skimming trough 90. The skimming trough 90 is similar in construction to the skimming trough 70, and, in fact, the inner wall 72 of the trough 70 forms the outer wall for the trough 90. The trough 90 includes a bottom wall 91 and an inner wall 92. Unlike the trough 70, the trough 90 terminates at the partition section 61.

A port 95 in the inner wall 92 of the trough 90 opens into the settling chamber 80. The mouth 96 of the trough 90 opens into the chamber 40. Suction created in the trough 90 by flow past the mouth 96 in the chamber 40 draws floating scum from the chamber 80 through the trough 90 into the chamber 40 in a skimming effect. The skimming concept and trough construction embodied in the troughs 70 and 90 form the basis of an invention disclosed in Kibbee U.S. Patent No. 3,195,727, issued July 20, 1965, and titled "Waste Products Treatment Apparatus Having Floating Solid Feedback Structure," and assigned to the same assignee as the present invention. Accordingly, they are not discussed here in further detail.

Sludge and sewage passing from the chambers 60 and 80 into the second stage aeration chamber 40 is aerated therein for several hours by agitation with rising columns of air 100 from a series of air diffuser pipes 102 depending from an air diffuser manifold 103 extending across the open top 20 of the tank 11 between the walls 18 and 19. Air under pressure from the aforementioned suitable source is emitted from the open lower ends 104 of the pipes 102 and induces a clockwise rotational flow of the sewage and sludge contents in the second stage aeration chamber 40 about the flow baffle 105, as seen in FIGURE 2.

The baffle 105 extends between the side walls 18 and 19 and terminates short of the floor 15 and the open top 20 of the tank 11. A short baffle 106 inclined against the partition wall 31 and the floor 15 of the tank deflects the flow of sludge and sewage upwardly along the partition wall 31 as it approaches the wall and the offset 32 in the wall 31 further directs the flow. It is this rotational flow of sludge and sewage in the second stage aeration chamber 40 which has been described as effective to create the suction effect in the open mouths 76 and 96 of the troughs 70 and 90, respectively, whereby surface skimming of the energy absorption chamber 60 and the settling chamber 80 is achieved.

Correspondingly, it is this rotational flow of sewage about the baffle 105 in the chamber 40 that creates the aforementioned suction effect which draws sludge settling in the chamber 60 and 80 through the mouth 43 into the second stage aeration chamber 40. It is important to note that this positive sludge removal from the chambers 60 and 80 is required because, in an aerobic biological treatment system, settled sludge exerts an oxygen demand which cannot be satisfied in the clarifier or settling chamber. As a result the sludge becomes anaerobic if not rapidly removed. When such a condition develops, the quality of the supernatant liquid discharged from the treatment is reduced considerably.

Raw sewage treatment by activated sludge and two stage aeration in the tank 11 embodying features of the present invention has now been described. During this treatment, activated sludge continues to be "manufactured" and, after a time, it is necessary to waste sludge. Sludge treatment is accomplished in the aerobic digestion section 26 of the tank 11, as has been pointed out.

The endogenous respiration section 26 includes an aeration chamber 120 and a stilling well 121 separated by a partition wall 122. The lower section 124 of the wall 122 is inclined toward the end wall 17 of the tank and terminates short thereof to leave an opening 125 between the stilling well 121 and the chamber 120. A right angle baffle member 130 has the free ends of its legs 131 secured to the end wall 17 immediately adjacent the opening 125, for reasons hereinafter discussed in detail.

A series of air diffusers 135 extend downwardly into the chamber 120 from a manifold 136 extending across the open top 20 of the tank 11 between the side walls 18 and 19. Air from the aforementioned suitable source under pressure enters the manifold 136 and passes down through the diffuser pipes 135 to be emitted at their open lower ends 140.

Columns of air bubbles 142 rise from the open lower ends 140 of the diffusers 135 and create a rotational flow of liquid (water primarily) in the chamber 120 in a counterclockwise direction around the intermediate baffle 145. The baffle 145 is constructed identical to the baffle 105 in the chamber 40 hereinbefore discussed and extends between the side walls 18 and 19 of the tank 11. It terminates short of the open upper end 20 and the floor 15 of the tank. Oppositely inclined baffles 146 and 147 on the floor 15 of the tank suitably direct fluid flow around the baffle 145 in cooperation with the lower leg 131 of the angle baffle member 130 and the inclined section 124 of the wall 122.

The rotational flow of liquid in a counterclockwise direction about the baffle 145 in the chamber 120 creates a suction in the trough 51, which extends into the chamber 120. This suction is created by the flow of liquid over the top of the baffle 145 past the horizontally inclined baffle 149 on the upstream side of the mouth 150 of the trough 51.

When the operator of the system 10 wishes to begin wasting sludge, a gate 154 on the inner wall 53 of the trough 51 in the chamber 40 is pivoted to its dotted line position, as seen in FIGURE 1, opening the port 155 in the wall 53 to the chamber 40. Gate 67 is adjusted to its full closed position to close off the port 50 into the first stage aeration chamber 30. Simultaneously, the gate 65 in the trough 51 is swung to its dotted line position closing off the port 56 in the inner wall 53 normally providing access to the energy absorption chamber 60. The suction in the trough 51 created by the rotational flow of liquid in the chamber 120 past the trough mouth 150 is effective to draw liquid and sludge through the trough 51 into the chamber 120.

The flow of waste sludge to the chamber 120 is further induced by a hydraulic imbalance created by the flow of supernatant liquid from the stilling well 121 through a port 156 in the baffle fall 122 into the end of the trough 70. This flow of supernatant liquid is effected by moving the gate 77 in the trough 70 from its solid line position to its dotted line position in FIGURE 1, opening the trough all the way between its mouth 76 and the opening 156 into the stilling well. Accordingly, the rotational flow of liquid sewage and sludge in the second stage aeration chamber 40 draws the supernatant liquid from the stilling well 121 through the trough 70 into the chamber 40. This flow is sufficient to create the hydraulic imbalance effective to aid drawing of sludge through the trough 51 into the chamber 120.

The flow pattern of the waste sludge and liquid in the chamber 120 is substantially identical to that achieved in the chamber 40, albeit in an opposite direction. The flow enters the stilling well 121 through the opening 125 between the baffle 130 and the baffle section 124 where stilling takes place. Sludge separates by gravity in the stilling well and flows back into the chamber 120 through the opening 125. Supernatant liquid is, as has been pointed out, drawn off from the stilling well 121 back into the chamber 40 through the skimming trough 70. Sludge scum which floats to the surface of the well 121 tends to be skimmed off into the chamber 120 through the short center trough 165 by suction created from the flow of sludge bearing liquid past its open mouth 166 in the chamber 120.

Continued aeration and agitation of the sludge and water in the sludge digestion section 26 and in the absence of untreated sewage serves to "digest" the sludge. The microbes actually feed upon themselves, reducing the bulk of the sludge considerably, and eventually resulting in a sludge ash which is virtually odorless and can readily be deposited on a field as fertilizer.

It will now be recognized that a unitary system 10 has been disclosed for treating raw sewage with activated sludge and then digesting the waste sludge. The normal operation of the system tank 11 is as a sewage treatment plant. When it is desirable to waste sludge, however, by endogenous respiration, it is merely necessary to connect the sewage treatment section with the waste sludge treatment section 26 of the tank 11 in the manner hereinbefore discussed according to the present invention.

The wasting of sludge by endogenous respiration in the treatment section 26 is carried out until the amount of sludge in the entire system 10 is reduced to an acceptable volume. During this time the air diffusers 34, 102, and 135 are operating.

The system 10 is compact and simple in construction. Accordingly, it is relatively inexpensive to construct, and its simplicity of operation makes it inexpensive to operate. Nevertheless it is highly efficient.

I claim:

1. An apparatus for effecting activated sludge treatment of sewage, and the endogenous respiration of excess sludge manufactured in the treatment, comprising: a treatment tank, means dividing said tank into a first stage aeration chamber, a second stage aeration chamber, an energy absorption chamber, a settling chamber, and sludge treatment chamber means, means for feeding solid bearing liquid sewage to said first stage aeration chamber, first connecting passage means for transferring sewage from said first stage aeration chamber to said energy absorption chamber, second connecting passage means for transferring sewage from said energy absorption chamber to said settling chamber, third connecting passage means for transferring solids from said energy absorption chamber and said settling chamber to said second stage aeration chamber, fourth connecting passage means for transferring sludge from said second stage aeration chamber to said first stage aeration chamber, aeration means in said first stage aeration chamber, aeration means in said second stage aeration chamber, fifth connecting passage means for transferring sludge from said second aeration chamber to said sludge treatment chamber means, sixth connecting passage means for transferring floating solids from said sludge treatment chamber means to one of said aeration chambers, means for withdrawing effluent from the settling chamber, aeration means in said sludge treatment chamber means, and control means in said first and fifth connecting passage means which prevent the flow of sludge to said sludge treatment chamber means during normal sewage treatment while allowing the flow of sewage from said first aeration chamber to said energy absorption chamber, and permitting the flow of sludge from said second stage aeration chamber to said sludge treatment chamber means during aerobic digestion treatment of the sludge, while preventing the flow of sewage from said first aeration to said energy absorption chamber.

2. The apparatus of claim 1 further characterized by and including seventh connecting passage means for transferring floating solids from said settling chamber to said second stage aeration chamber.

3. The apparatus of claim 2 further characterized in that said first, fifth, sixth and seventh connecting passage means comprise trough means extending along at least one side of the treatment tank.

4. The apparatus of claim 1 further characterized in that said sludge treatment chamber means includes means separating said chamber means into an aeration chamber and a stilling well, said sixth connecting passage means extending into said stilling well, said fifth connecting passage means extending into said aeration chamber of said sludge treatment chamber means.

References Cited

UNITED STATES PATENTS

| | | | |
|---|---|---|---|
| 2,477,815 | 5/1949 | Mallory | 210—195 X |
| 2,562,510 | 7/1951 | Schlenz | 210—5 |
| 2,642,394 | 6/1953 | Paulette et al. | 210—195 X |
| 2,786,025 | 3/1957 | Lamb et al. | 210—197 X |
| 2,901,114 | 8/1959 | Smith et al. | 210—256 X |
| 3,047,492 | 7/1962 | Gambrel | 210—195 X |
| 3,195,727 | 7/1965 | Kibbee | 210—221 X |

REUBEN FRIEDMAN, *Primary Examiner.*

J. L. DE CESARE, *Assistant Examiner.*